UNITED STATES PATENT OFFICE.

SAMUEL S. RITTER, OF PHILADELPHIA, PENNSYLVANIA.

IMPROVEMENT IN STUDS AND BUTTONS.

Specification forming part of Letters Patent No. 47,661, dated May 9, 1865.

*To all whom it may concern:*

Be it known that I, SAMUEL S. RITTER, of the city and county of Philadelphia, in the State of Pennsylvania, have invented a new and useful Improvement in Studs and Buttons; and I do hereby declare the following to be a full and exact description of the same, reference being had to the accompanying drawings making part of this specification, in which—

Figure 1 is a central section of a stud, illustrating my invention. Figs. 2 and 3 are detached views of the two parts in which the stud is formed.

Similar letters of reference indicate corresponding parts in the two figures.

This invention relates to a stud whose two disks are capable of being detached and coupled, so that in putting it into the bosom or sleeve it will only be necessary to insert the stem or shank through the button-hole, said shank being joined to one of the disks, and the stud having a provision for the application of the other after being passed through the button-hole.

The improvement consists in a novel contrivance for coupling and uncoupling the two parts or disks of the stud.

In order that others skilled in the art to which my invention appertains may be enabled to fully understand and use the same, I will proceed to describe its construction and operation.

In the accompanying drawings A A′ represent the two disks or parts of the stud or button, and B the coupling-shank, which latter is permanently joined or secured to the disk A′. In the shank B are formed notches or grooves *b b*, which may be occupied by springs *a′ a′* when the shank is inserted into the sleeve *a* as far as the disk A will permit it to go. If the springs *a′ a′* do not enter the notches *b b* as soon as the shank is inserted, a slight turn will cause them to do so, and when the springs are in the notches the two parts A A′ of the stud or button are securely locked together. The turning of either of the disks A or A′ will also cause the periphery of the shank B to spread the springs, and this turning will change the relative positions of the parts in such a manner that the springs *a′*, instead of occupying the notches *b b*, may be made to rest upon the adjacent part of the periphery of the shank B, and when the parts are thus situated the shank B can be withdrawn from the sleeve *a* and the two disks separated.

The simplicity of this invention renders a more detailed description unnecessary.

It is apparent that one spring may be used instead of two, and this modification may be made without departing from the essential principle of my invention.

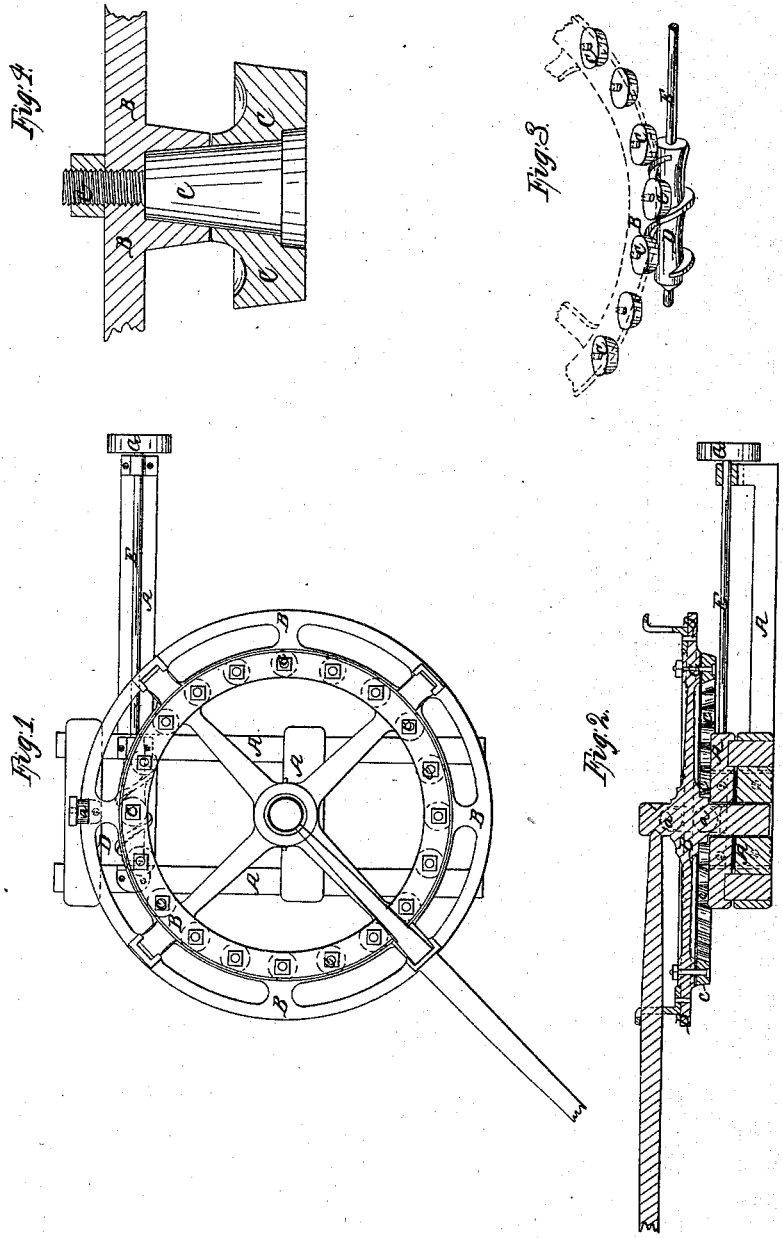

Having thus described my invention, what I claim as new, and desire to secure by Letters Patent, is—

Providing a stud or button with a spring or springs, *a′*, and a notch or notches, *b*, permitting the two disks A A′ to be coupled and uncoupled at will, substantially as and for the purpose explained.

To the above specification of my improvement in buttons I have signed my hand this 12th day of January, 1865.

S. S. RITTER.

Witnesses:
EDWARD H. KNIGHT,
CHARLES D. SMITH.